United States Patent
Avanci et al.

(10) Patent No.: US 6,520,089 B1
(45) Date of Patent: Feb. 18, 2003

(54) METHOD FOR SETTING AND IGNITING A CHARGE OF EXPLOSIVES FOR GEOLOGICAL INVESTIGATIONS AND EXPLOSIVE DEVICE ASSOCIATED THEREWITH

(75) Inventors: Aurellius Avanci, Udine (IT); Pierre Corre, Paris (FR); Rolf Rospek, Edemissen (DE)

(73) Assignee: DYNAenergetics GmbH & Co. KG, Troisdorf (DE)

(*) Notice: Subject to any disclaimer, the term of this patent is extended or adjusted under 35 U.S.C. 154(b) by 0 days.

(21) Appl. No.: 09/980,498

(22) PCT Filed: Jun. 19, 2000

(86) PCT No.: PCT/EP00/05617
§ 371 (c)(1),
(2), (4) Date: Apr. 12, 2002

(87) PCT Pub. No.: WO00/79212
PCT Pub. Date: Dec. 28, 2000

(30) Foreign Application Priority Data

Jun. 18, 1999 (DE) .......................................... 199 27 874
Jan. 18, 2000 (DE) .......................................... 100 01 776

(51) Int. Cl.⁷ ............................................... F42B 3/087
(52) U.S. Cl. .................... 102/323; 102/312; 102/313; 102/324; 86/20.12; 86/20.15
(58) Field of Search ................................. 102/312, 313, 102/323, 324; 86/20.12, 20.15

(56) References Cited

U.S. PATENT DOCUMENTS

| | | | | |
|---|---|---|---|---|
| 2,020,410 A | * | 11/1935 | Greene | 102/313 |
| 3,696,703 A | * | 10/1972 | Fox | 86/20.12 |
| 3,867,867 A | * | 2/1975 | Duff | 86/20.12 |
| 4,040,330 A | * | 8/1977 | Matzen | 86/20.12 |
| 4,464,993 A | * | 8/1984 | Porter | 86/20.12 |
| 4,592,282 A | * | 6/1986 | Niemi et al. | 102/313 |
| 4,813,358 A | * | 3/1989 | Roberts | 102/324 X |
| 5,092,245 A | * | 3/1992 | Douglas et al. | 102/324 |
| 5,099,763 A | * | 3/1992 | Coursen | 86/20.15 |
| 5,192,819 A | * | 3/1993 | Baumgartner | 102/324 |
| 5,259,316 A | * | 11/1993 | Nelson et al. | 102/312 |
| 5,513,570 A | * | 5/1996 | Mulcahy | 102/313 X |
| 6,070,511 A | * | 6/2000 | Palmer | 102/313 X |

FOREIGN PATENT DOCUMENTS

| | | | |
|---|---|---|---|
| DE | 2031282 | * | 1/1971 |
| FR | 2218549 | * | 9/1974 |
| WO | WO97/48967 | * | 12/1977 |
| WO | WO 97/21068 | * | 6/1997 |

* cited by examiner

*Primary Examiner*—Peter A. Nelson
(74) *Attorney, Agent, or Firm*—Antonelli, Terry, Stout, & Kraus, LLP

(57) ABSTRACT

A method for setting and igniting a charge of explosives for geological investigations, comprising the following steps: a hole (14) is drilled in the ground (12) which is to be investigated; an explosion chamber (22) is hollowed out, whereby said explosion chamber has an expanded form in relation to the bore hole (14) at the end of said bore hole (14); an ignition element (34) and an explosive container (36) containing an explosive in a protective blister (54) surrounding the ignition element are lowered down into the explosion chamber (22); the explosive (42) is pressed out of the explosive container (36) into the explosion chamber (22) and the ignition element (34) is ignited In comparison with conventional methods, the inventive method provides for a considerably smaller diameter of bore hole, whereby said bore hole is substantially easier to drill.

15 Claims, 5 Drawing Sheets

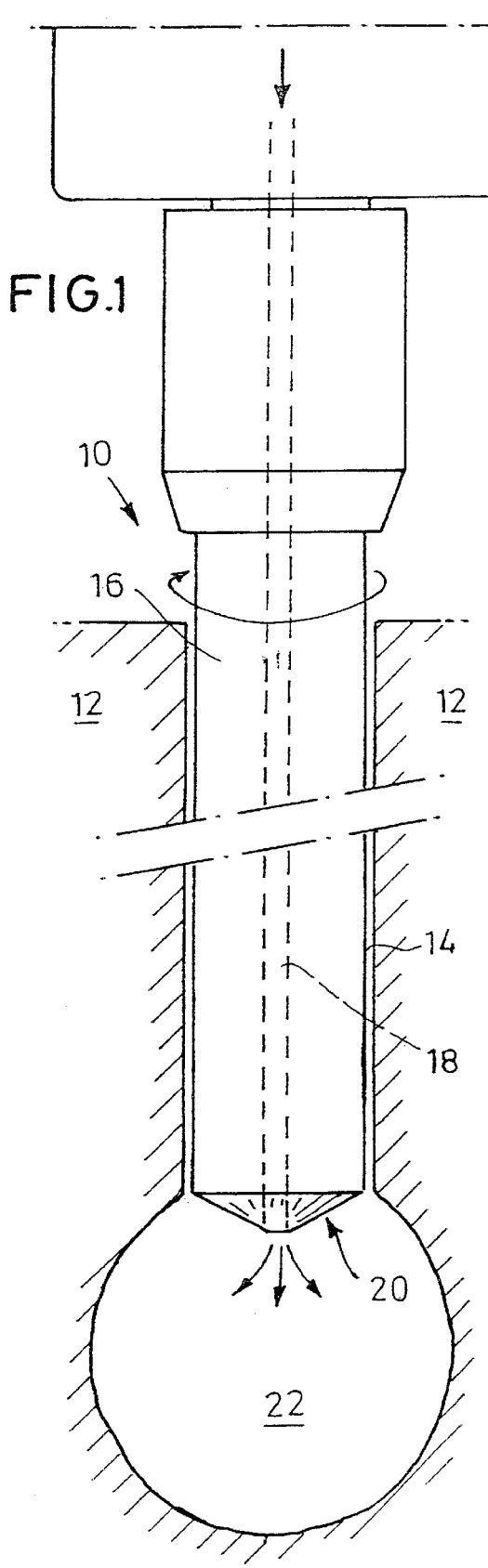
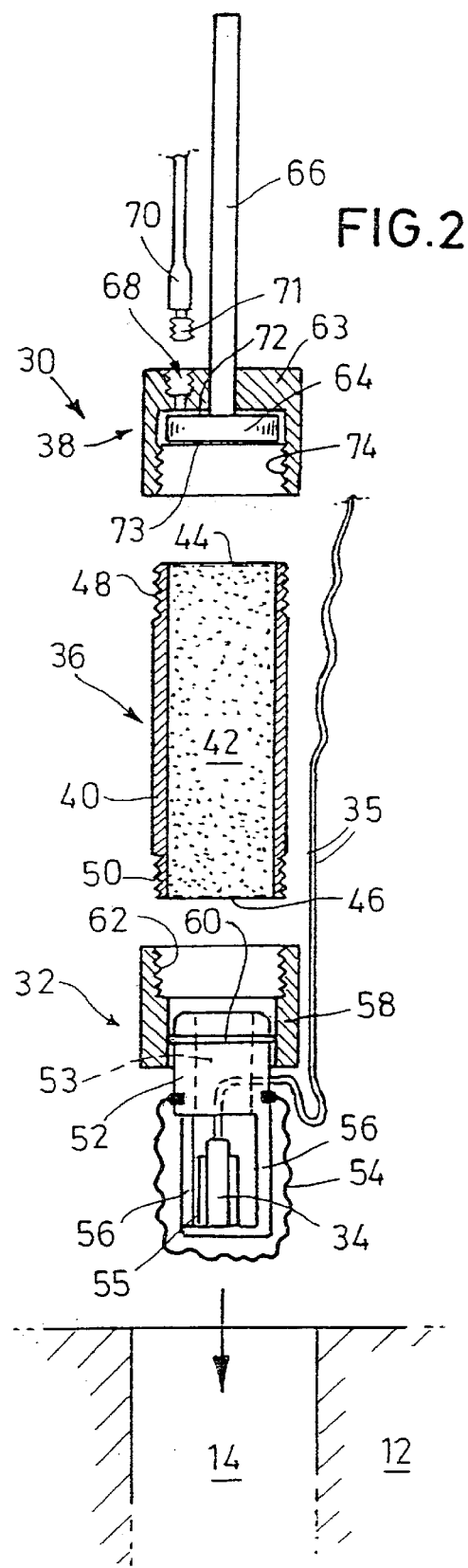

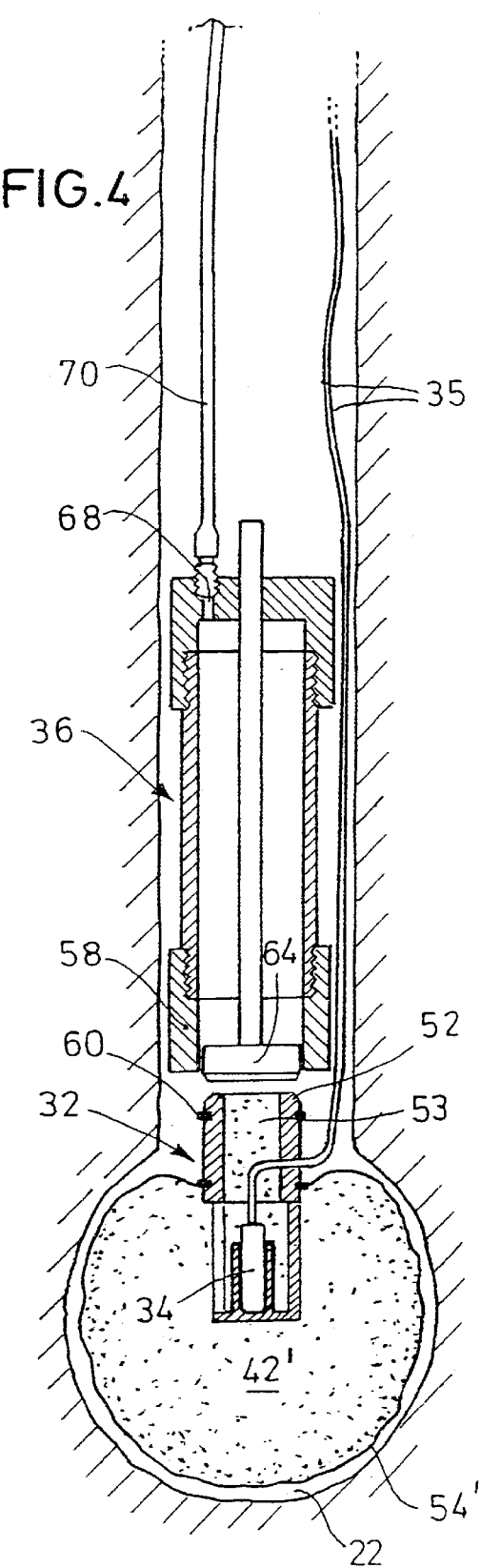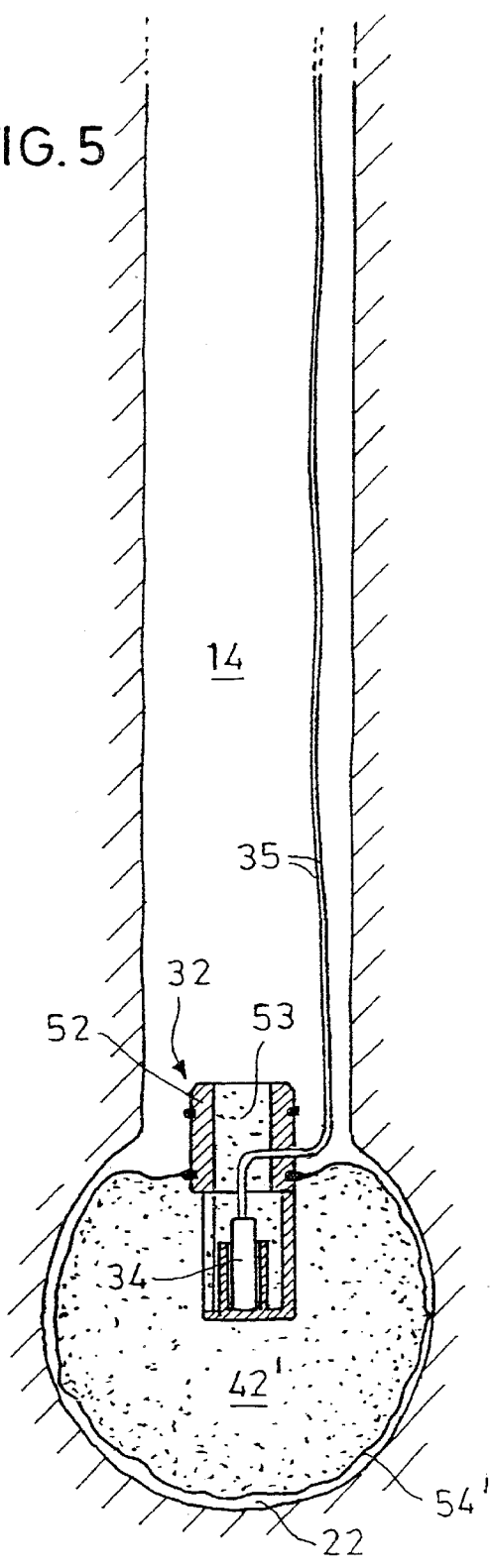

METHOD FOR SETTING AND IGNITING A CHARGE OF EXPLOSIVES FOR GEOLOGICAL INVESTIGATIONS AND EXPLOSIVE DEVICE ASSOCIATED THEREWITH

The invention relates to a method for placing and igniting a blasting charge for geological tests and to a blasting device for geological tests.

With known methods for preparing for blasting, first of all a shot-hole is drilled, using boring tools, in the ground which is to be tested. Subsequently, an explosives container with an ignition element is lowered into the shot-hole. The shot-hole is then closed and the ignition is triggered. The explosives container has a concentrated spherical or parallelepipedal form in order to realize a centre of explosion that is as punctiform as possible, as is necessary for accurate geological tests. The selected shot-hole diameter must be at least so large that the explosives container passes therethrough and can be lowered effortlessly to the base of the shot-hole. For this purpose, typically shot-hole diameters of 80 mm to 150 mm are required. However, these comparatively large shot-hole diameters have the disadvantage that the shot-holes which are typically 10–30 m deep, involve outlay, are time-consuming and therefore are also costly.

The object of the invention is to provide an improved blasting method and an improved blasting device for geological tests.

The method in accordance with the invention has the initial method steps of drilling a shot-hole in the ground to be tested and hollowing out a blasting space, widened in relation to the shot-hole, at the end of the shot-hole. The shot-hole can be drilled to a comparatively small diameter which need only be dimensioned so that it is of a sufficient size to make the widened blasting space accessible, yet does not have the diameter of the blasting space. Subsequently, an ignition element and a slender explosives container are lowered through the shot-hole into the blasting space and the explosive is forced out of the explosives container into the widened blasting space, where it collects in a concentrated manner in the form of a sphere. Finally, the ignition element is ignited.

Only the blasting space at the lower end of the shot-hole is of a comparatively large width, which is necessary to accommodate the explosive in a concentrated, non bar-shaped form, whilst the selected width of the shot-hole can be just so small to make the blasting space accessible and to load it. To this end, shot-hole diameters of 25 to 60 mm suffice. For the purpose of loading explosives into the widened blasting space through the narrowed shot-hole, the explosive, which is packed in a slender explosives container, together with the ignition element, although so as to be spatially separate from the latter, is lowered through the shot-hole to the blasting space. The diameter of the explosives container is so small that it can be lowered through the shot-hole without any difficulties. When the explosive reaches the blasting space, it is forced out of the slender explosives container and is distributed over the entire width of the blasting space, which is widened in relation to the shot-hole, and is finally ignited. As a result of transporting the explosive to the end of the shot-hole in a slender explosives container that is adapted to the small shot-hole width, the explosive can also be moved through very narrow shot-holes to the shot-hole base. As a result of the fact that the shot-hole diameter is small, drilling can be carried out in a rapid and inexpensive manner and with fewer complications.

The blasting space is preferably hollowed out by introducing a scavenging fluid to the shot-hole end and scavenging out the blasting space with the scavenging fluid that has been introduced. This scavenging-out process can be carried out by injecting compressed air, steam or water. Approximately 80% of geological ground tests are carried out in comparatively soft ground or layers of earth. The comparatively simple manner of widening the lower shot-hole end to form a widened blasting space by scavenging this out with a fluid, for example air, water vapour or water, is a simple and effective method for hollowing out a widened blasting space in comparatively soft ground.

Before the lowering process, an ignition-element holder, holding the ignition element, and the explosives container are preferably coupled together. After the explosive has been forced out into the blasting space, the explosives container is repelled from the ignition-element holder and hauled up out of the bore hole. The ignition-element holder and the explosives container, thus coupled together to form a unit, are lowered through the shot-hole to the blasting space, the explosive is expressed out of the explosives container into the blasting space, the explosives container is separated from the ignition-element holder and the explosives container is finally drawn back out of the shot-hole. On the one hand, on account of the coupling, it becomes easier to lower the explosives container and the ignition-element holder and, on the other hand, as a result of the subsequent separation, the explosives container can be hauled up, re-filled with explosive and used for further blasting.

According to a preferred embodiment of the method, before the ignition element and the explosives container are lowered, a pressure hose is attached to the explosives container and, after the lowering process, the explosive is forced out of the container as a result of applying pressure to the explosives container through the pressure hose. Thus, a non-electrical method is provided for expressing the explosive out of the explosives container, which method does not entail any additional risks of unintentional premature ignition and operates in a very reliable manner. An alternative solution is the use of a push rod for mechanically forcing out the explosive.

The explosives container is preferably pushed off as a result of applying pressure through the pressure hose to a detachable coupling between the explosives container and the ignition portion. The action of pushing off or uncoupling the explosives container from the ignition-element holder by applying pressure, for example by means of compressed air, does not hold any additional risks of an explosion being triggered unintentionally, can be realized in a simple manner mechanically and is highly reliable.

The blasting device in accordance with the invention for geological tests in accordance with claim 6 has an explosives container with free-flowing explosive, which explosives container can be lowered in a shot-hole in a suspended manner, a device for forcing the explosive out of the explosives container, an ignition-element holder arranged on the explosives container with an ignition element for igniting the explosive which has been forced out, and a flow path through which the explosive, which has been forced out, can flow from the explosives container to the ignition element. The explosive is transported in a transport container as far as the actual blasting location, for example as far as the base of the shot-hole, and only there is forced out of the explosives container. The cross section of the explosives container and the cross section of the ignition-element holder are adapted to the shot-hole diameter so that explosive can also be transported through narrow shot-holes in a complete and reliable manner as far as the end of the shot-hole. In this way, shot-holes that have comparatively small diameters suffice, whereby the costs of drilling and the time spent drilling the shot-hole are in turn reduced. The explosive first reaches the blasting location whilst in contact with the ignition element. Unintentional triggering of an explosion, before the explosive has reached the base of the shot-hole, is thereby precluded, whereby the handling thereof becomes safer.

According to a preferred embodiment, the ignition-element holder is arranged axially in front of the explosives container, with the explosive being forced out of the explosives container through the substantially axial flow path in the direction of the ignition element. In this way, it is possible to realize a very slender construction, for the explosives container and ignition-element holder. The explosive, which is expressed out of the explosives container, runs downwards out of the explosives container and surrounds the ignition-element holder, arranged below the explosives container, and the ignition element respectively. As a result of this arrangement, the overall construction that is realized is slender and it is guaranteed that the explosive is reliably forced out in the direction of the ignition element.

The explosives container preferably has a pushing off device for pushing the detachable explosives container off from the ignition-element holder. After the explosive has been forced out, the explosives container can be pushed off from the ignition-element holder remaining in the bore hole and can be drawn back out of the bore hole. The explosives container can subsequently be refilled with explosive and can be reused.

According to a preferred embodiment, the explosives container is an elongated cylinder body and the forcing out device is a plunger which can be moved in a longitudinal direction in the cylinder body. The plunger-cylinder arrangement represents a construction of the explosives container with a forcing out device that is slender and at the same time functions in a reliable manner.

According to a preferred embodiment, the explosives container has a pressure-hose connection through which pressure can be applied to the rear side of the plunger that is remote from the explosive. A pressure hose, for example an air-pressure hose, is connected to the pressure-hose connection before the explosives container is lowered. As soon as the explosives container has been lowered and has reached the base of the shot-hole, pressure is applied to the plunger by way of the pressure hose so that the plunger forces the explosive out of the explosives container. As a result of the use of compressed air to drive the plunger or differently designed forcing out devices, no additional risk of explosion arises. The compressed-air drive of the plunger can be realized in a reliable and inexpensive manner.

The ignition-element holder preferably has a protective pocket, which surrounds the ignition element, for the purpose of accommodating the explosive which is forced out. In this way, the explosive remains concentrated in the form of a sphere about the ignition element and cannot seep away in the ground. At the same time, the protective pocket protects the ignition element when the ignition-element holder is lowered and subsequently protects the explosive, which is forced out, from contamination, moisture and water from outside.

According to a preferred embodiment, the plunger forms the pushing off device, with the plunger and the explosives container being designed in a such a way that at the end of its forcing out travel the plunger pushes the ignition-element holder off from the explosives container. The plunger is thus used both to express the explosive out of the cylinder and also—at the end of its plunger stroke—as a pushing off device to push the emptied explosives container off from the ignition-element holder. A simple construction and design of a pushing off device are thus realized.

As an alternative to this, the pushing off device can also be formed by a fluid duct on the explosives container, in which case the fluid duct ends at a stop face of the ignition-element holder and pressure can be applied by way of the pressure-hose connection to push off the ignition-element holder. This can be effected, for example, by first opening up the fluid duct at the end of the plunger stroke, whereupon pressure from the pressure hose or pressure-hose connection is applied to the fluid duct. The pressure acts through the fluid duct on the stop face of the ignition-element holder, whereby the explosives container is pushed back or pushed off the ignition-element holder. With this construction as well, a simple pushing off device is provided that uses the pressure-hose connection as an energy source.

Exemplifying embodiments of the invention are explained in greater detail in the following with reference to the drawings, in which:

FIG. 1 shows a longitudinal section through a shot-hole when drilling the shot-hole and hollowing out a widened blasting space;

FIG. 2 shows a longitudinal section through a blasting device, consisting of a plunger-forcing out device, an explosives container and an ignition-element holder, in the disassembled state;

FIG. 4 shows the assembled blasting device of FIG. 2 in the region of the blasting space, with the explosives container being pushed off from the ignition-element holder;

FIG. 5 shows a longitudinal section through the blasting space, filled with explosive, with the ignition-element holder;

Figure 3:
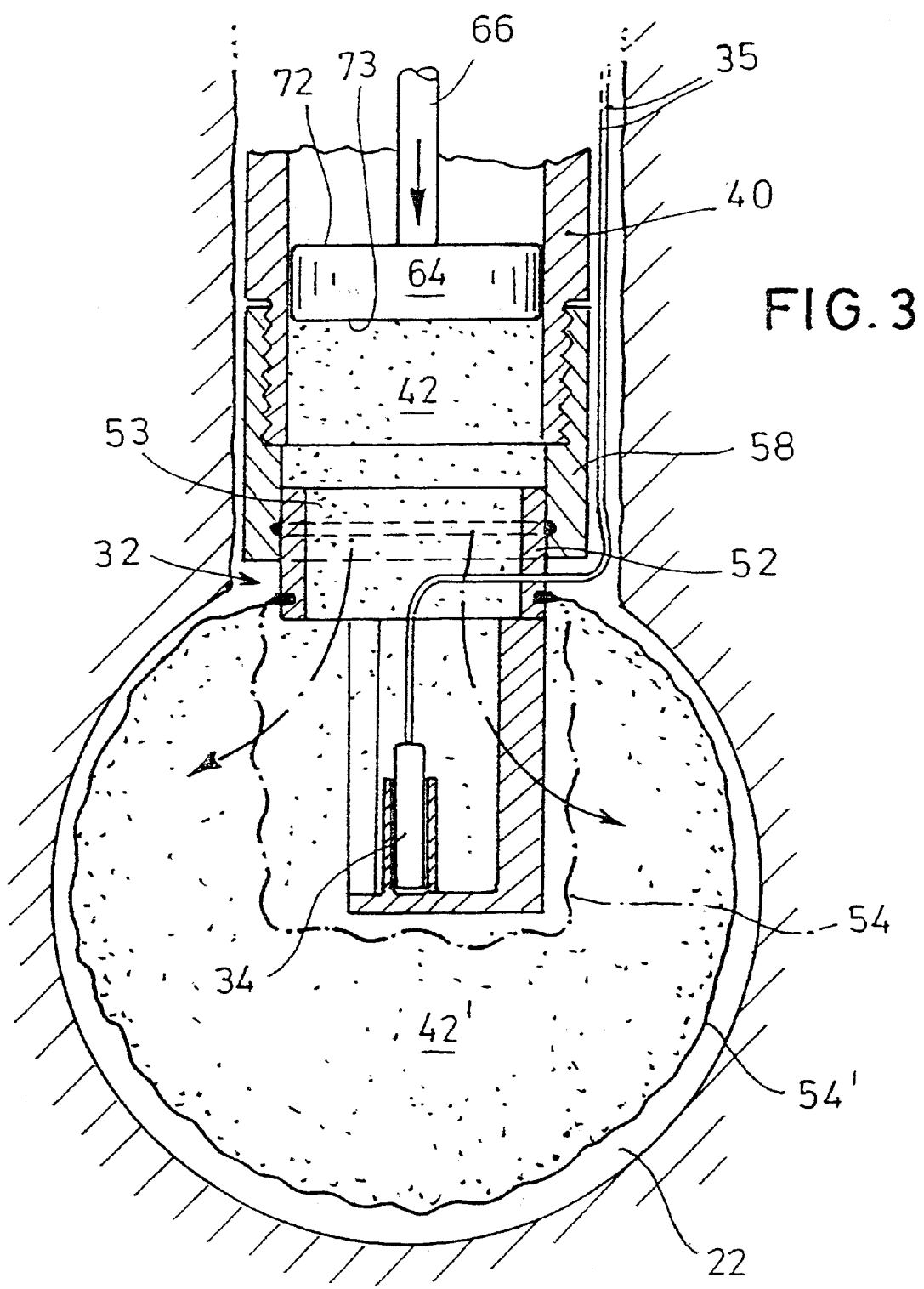
FIG. 3 shows a longitudinal section through a portion of the assembled blasting device which has been lowered into the blasting space when the explosive is being expressed.

The important steps of the method for drilling a shot-hole and placing a blasting charge for geological tests are represented in FIGS. 1 to 5. In the first instance, as shown in FIG. 1, a shot-hole 14 is bored, by means of a drill 10, in the ground 12 which is to be tested. In this connection, the drilling means 16 of the drill 10 and the shot-hole 14 can have a diameter of approximately 25 to 60 mm. The length of the shot-hole is determined by the desired depth of the explosion centre and as a rule amounts to between 10 m and 30 m. The drilling means 16 have a central scavenging line 18 through which a scavenging fluid can be directed to the drill bit 20. By introducing scavenging fluid and, if applicable, subsequently pumping it out, a blasting space 22 is hollowed out at the lower end of the shot-hole 14 to the desired depth of the subsequent explosion centre. The blasting space 22 is substantially formed in the manner of a sphere and has a volume of several litres. Air or even water, steam or similar means can be used as a scavenging fluid. After drilling the shot-hole 14 and scavenging out the blasting space 22, the drilling means 16 is hauled up again.

A first embodiment of a blasting device 30, which substantially consists of an ignition-element holder 32 with an ignition element 34, an explosives container 36 and a forcing out device 38, is shown in FIG. 2. The ignition-element holder 32, the explosives container 36 and the forcing out device 38 are first assembled at the shot-hole 14, as shown in FIGS. 3 and 4.

The explosives container 36 is a cylindrical body 40 which is filled with a free-flowing explosive 42 and is sealed at both longitudinal ends with a respective sealing foil 44, 46. At both longitudinal ends the cylinder body 40 has a respective external thread 48, 50. The cylinder body 40 consists of aluminium, yet can also be made of plastics material or other suitable materials. The outside diameter of the cylinder body 40 lies between 15 and 60 mm, with its length lying between 50 and 2000 mm. The foils 44, 46 consist of plastics-coated paper, aluminium or plastics material. A protective cap can be screwed onto both ends of the explosives container for transportation.

The ignition-element holder 32 consists of a frame portion 52 which holds the ignition element 34. Furthermore, a protective pocket 54 is fixed around the lower half of the frame portion 52 and is fixed in a circumferential groove of the frame portion 52 with a wire ring. The frame portion 52 consists of aluminium, but can also be made of plastics material. In its lower half the frame portion 52 has three axial legs 56 which converge at their lower ends in the shape of a star and in the centre of which the ignition element 34 is inserted in a cup 55 that is open upwards. The protective pocket 54 is elastically formed and is made of rubber or plastics. The protective pocket can alternatively also have a specific plasticity so that it conforms plastically to the space. Its volume in the relaxed state amounts to approximately 3 litres. The protective pocket 54 is water-tight and protects the explosive, which is later poured in, against the environment and prevents the explosive from seeping away into the ground.

The upper end of the frame portion 52 is inserted into a hollowly cylindrical adapter portion 58. At its upper end the frame portion 52 has an outwardly circumferential groove in which an elastic O-ring 60 is fixed. In this way, it is guaranteed that the frame portion 52 is held clamped in the adapter portion 58, yet can be ejected in opposition to the frictional forces between the O-ring 60 and the inner circumference of the adapter portion 58. The upper end of the adapter portion 58 has an internal thread 62, which can be screwed onto the external thread 50 of the explosives container 36. In its upper half the frame portion 52 has a central axial bore 53 which forms a flow path for the explosive 42 out of the explosives container 36 in the direction of the ignition element 34.

The forcing out device 38 has a cup-like body 63 and a plunger 64 therein which is guided by means of a plunger rod 66, whereby tilting of the plunger 64 during the subsequent plunger stroke in the cylinder body 40 is precluded. The forcing out device 38 has, furthermore, a pressure-hose connection 68 for connection of a pressure hose 70. Pressure can be applied to the rear side 72 of the plunger by means of compressed air through the pressure hose 70. The plunger 64 is driven in this way. At the lower open end of the cup body 63 the forcing out device 38 has an internal thread 74 which can be screwed onto the external thread 48 of the explosives container 36. Guidance of the cylinder can also be guaranteed by means of a higher cylinder. In this case, it is possible to dispense with the plunger rod.

As soon as the shot-hole 14 and the blasting space 22 have been completed, the blasting device 30 is assembled. The ignition element 34 is inserted into the ignition-element cup 55 and the ignition lines 35 are guided out of the frame portion 52 through a radial channel. If applicable, the protective caps are subsequently unscrewed from the two ends of the explosives container 36 and the lower end of the explosives container 36 is screwed into the adapter portion 58 of the ignition-element holder 32. Subsequently, the forcing out device 38 is screwed onto the other end of the explosives container 36. Finally, the pressure hose 70 is coupled to the pressure-hose connection 68, for example by screwing in a suitable pressure-hose coupling portion 71.

In this assembled state, the blasting device 30 is ready to be lowered into the shot-hole 14 as far as the blasting space 22. During the lowering process, the blasting device 30 is suspended exclusively on the pressure hose 70.

As soon as the blasting device 30 has reached the lower end of the shot-hole 14 in the blasting space 22, pressure of 3 to 10 bar is applied to the rear side 72 of the plunger by way of the pressure hose 70 by means of a compressed-air generator. As a result, the plunger 64 is pressed downwards in an axial direction. In so doing, it first pierces the foil 44 and subsequently pushes the explosive 42 downwards out of the cylinder body 40. The explosive 42 thereby pierces the lower foil 46 and, by way of the flow path 53, reaches the protective pocket 54. The protective pocket 54 is then slowly completely filled with all the explosive 42 so that the protective pocket 54' takes on the form of a balloon.

After the explosives container 36 has been emptied, the front side 73 of the plunger 6.4 strikes against the upper edge of the frame portion 52 and thus pushes the frame portion 52 downwards out of the adapter portion 58 so that the explosives container 36 is separated from the frame portion 52 and can be drawn back out of the bore hole 14, suspended on the pressure hose 70.

Only the frame portion 52, the ignition element 34 and the explosive 42' in the protective pocket 54' remain in the blasting space 22, as shown in FIG. 5.

Figure 6:
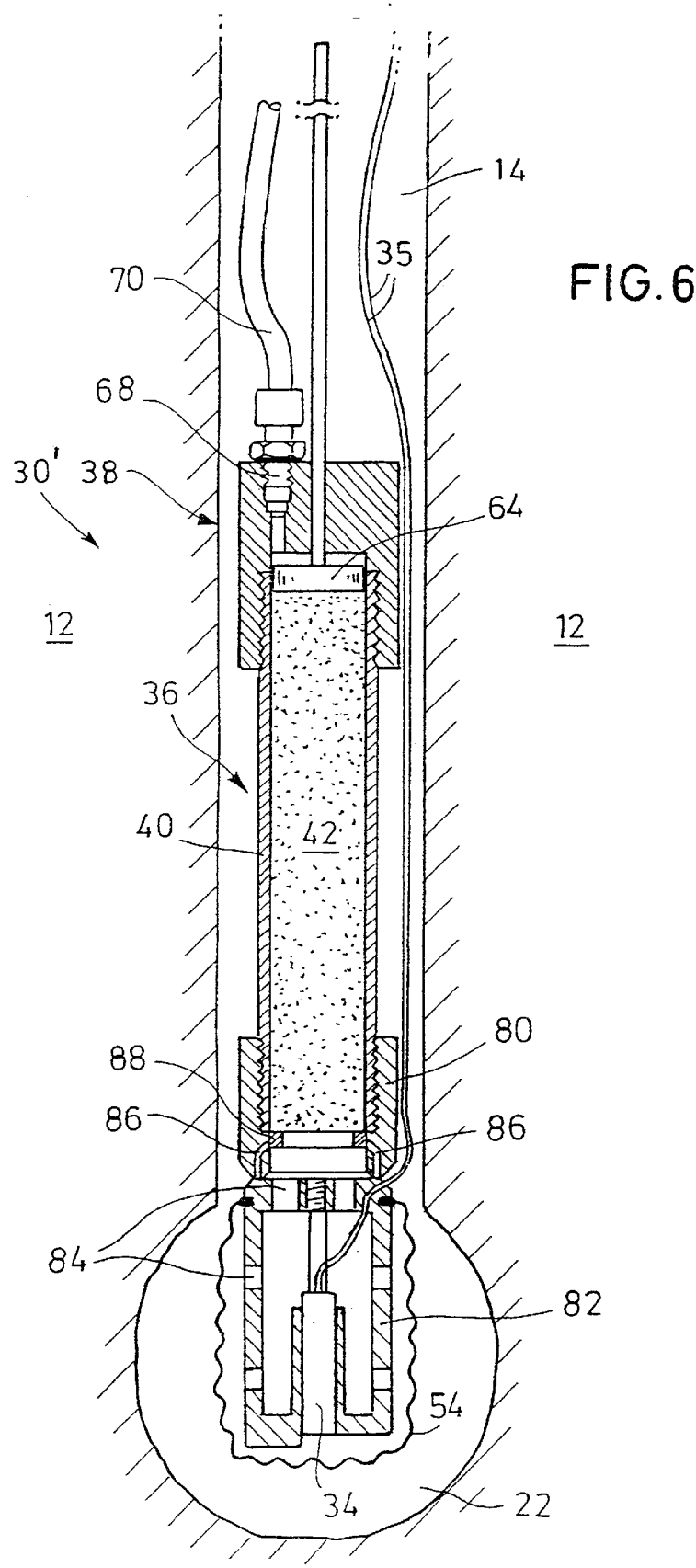
FIG. 6 shows a second embodiment of the blasting device with fluid channels for pushing off the explosives container from the ignition-element holder.

A second embodiment of a blasting device 30' is shown in FIG. 6, in which the pushing off device is designed differently from the pushing off device in the case of the embodiment shown in FIGS. 1 to 5.

The adapter portion 80 is connected to the frame portion 82 by way of narrow material bridges. The material bridges form predetermined breaking points. The frame portion 82 has a plurality of through-openings 84 as flow channels through which the explosive 42 can emerge out of the explosives container 36 during the forcing out process and can emerge into the environment of the ignition element 34 and into the protective pocket 54. The adapter portion 80 has a plurality of fluid channels 86, the one opening end of which in each case ends at the upper stop face of the frame portion 82 and the other opening end of which leads radially to the interior space. The radial fluid channel openings are closed by means of a protective rubber ring 88.

As already described, the explosive 42 is forced out of the explosives container 36 as a result of the application of pressure through the pressure hose 70 and the downward movement of the plunger 64. At the end of the plunger travel, the plunger 64 strikes against the ring 88 and displaces the latter further downwards. As a result, the fluid channels 86 are cleared. As soon as the plunger 64 has passed the fluid channels, pressure is applied to each fluid channel 86 from the pressure-hose connection 68 and the pressure hose 70 respectively. This pressure acts on the face of the frame portion 82 so that a pushing off force is applied there, by means of which force the explosives container 36 is pushed off from the frame portion 82, with, at the same time, the material bridges between the adapter portion 80 and frame portion 82 tearing open.

At the end of the pushing off process the compressed air can escape into the bore hole 14 so that a pressure drop occurs in the pressure hose 70. This pressure drop is a signal for the fact that the explosives container 36 has been successfully pushed off. The pressure drop is used as a signal to haul up the pushed off explosives container.

Figure 7:
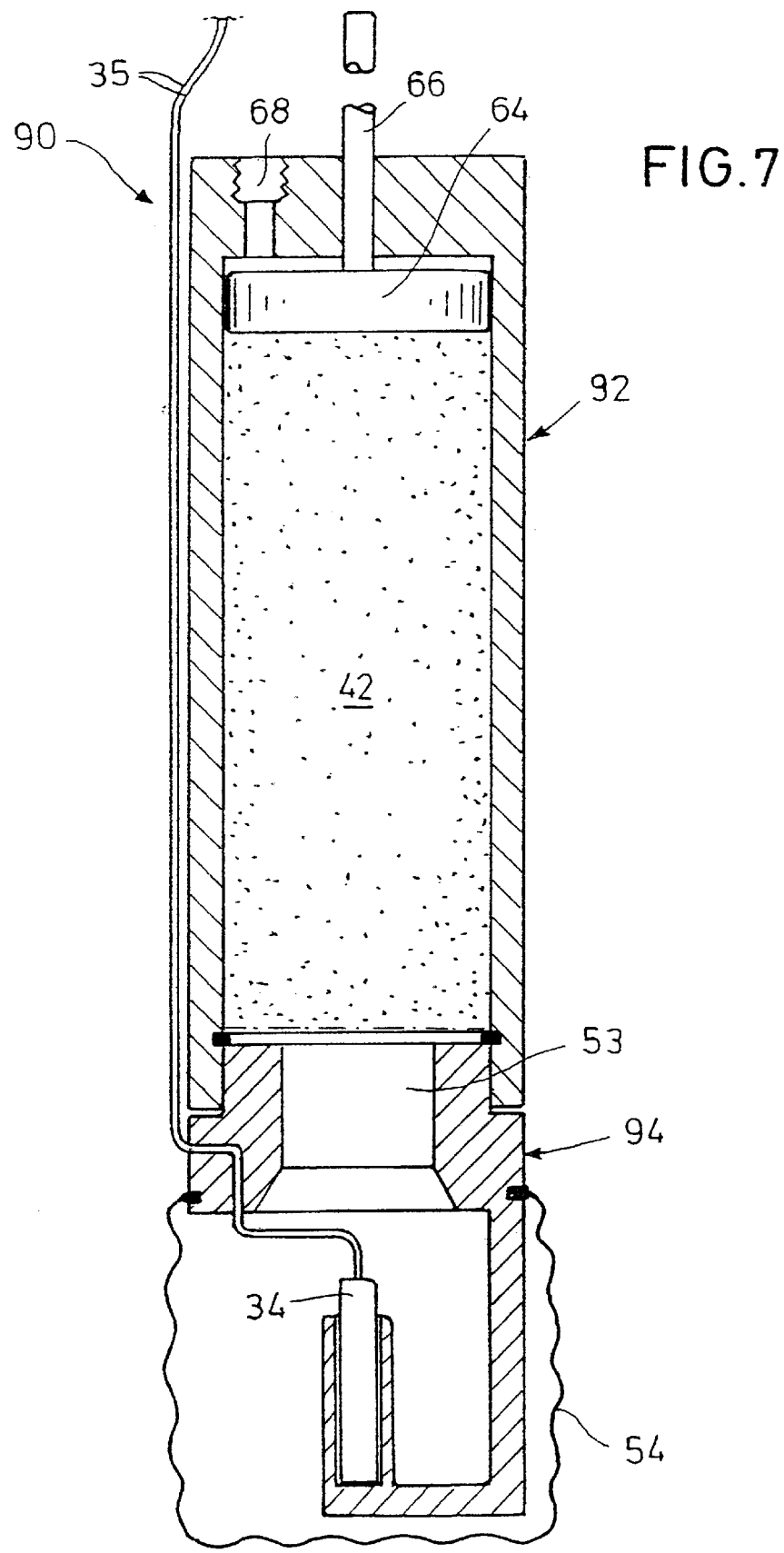
FIG. 7 shows a third embodiment of a blasting device.

A further embodiment of a blasting device 90, which substantially consists of a one-piece explosives-container body 92 and an ignition-element holder 94 also formed in one piece, is shown in FIG. 7. The explosives-container body 92 and the ignition-element holder 94 are fitted into each other, in such a way that they engage, at the shot-hole. The explosives-container body 92 and the ignition-element holder 94 are each made of plastics material or otherwise of a light metal, aluminium or a similar material. On account of its simple construction, the blasting device 90 can be produced in an inexpensive manner and can be assembled with ease.

The explosive 42 which is used is an homogenous water-in-oil-emulsion type explosive and can be sensitized by means of micro-hollow spherules or by means of chemical compounds. The explosive has a density of 1.0 to 1.5 g/cm$^3$ and a viscosity of 30,000 cP to 2,000,000 cP.

What is claimed is:

1. Method for placing and igniting a blasting charge (30; 90) for geological tests, having the steps;
   drilling a shot-hole (14) in the ground (12) to be tested,
   hollowing out a blasting space (22), widened in relation to the shot-hole (14), at the end of the shot-hole (14),
   lowering an ignition element (34) and an explosives container (36; 92) into the blasting space (22),
   forcing the explosive (42) out of the explosives container (36; 92) into the blasting space (22), and
   igniting the ignition element (34).

2. Method according to claim 1, characterised by hollowing out the blasting space (22) by introducing a scavenging fluid to the end of the shit-hole and scavenging out the blasting space (22).

3. Method according to claim 1, characterised by, before the lowering processes:
   coupling an ignition-element holder (52), holding the ignition element (34), to the explosives container (36; 92), and, after forcing out the explosive:
   pushing the explosives container (36; 92) off from the ignition-element holder (52) and hauling the pushed-off explosives container (36; 92) up out of the bore hole 914).

4. Method according to claim 1, characterized by,
   before the lowering process:
      attaching a pressure hose (70) to the explosives container (36; 92), and, after the lowering process:
      forcing out the explosive by applying pressure to the explosives container (36; 92) through the pressure hose (70).

5. Method according to claim 3, characterised by pushing off the explosives container (92) by applying pressure through the pressure hose (70) to a detachable coupling between he explosives container (92) and the ignition-element holder (82).

6. Blasting device for geological tests, having
   an explosives container (36; 92) with free-flowing explosive (42), which explosives container can be lowered in a shot-hole (14) in a suspended manner,
   a forcing out device (64) for forcing the explosive (42) out of the explosives container (36; 92),
   an ignition-element holder (32), arranged on the explosives container (36; 92), with an ignition element (34) for igniting the explosive (42') which has been forced out, and
   a flow path (53) through which the explosive (42), which has been forced out, can flow from the explosives container (36; 92) to the ignition element (34).

7. Blasting device according to claim 6, characterised in that the ignition-element holder (32) is arranged axially in front of the elongated explosives container (36; 92) and the explosive (42) is forced out of the explosives container (36; 92) through the substantially axial flow path (53) to the ignition element.

8. Blasting device according to claim 6, characterised in that the explosives container (36; 92) has a pushing off device for pushing the detachable explosives container (36; 92) off from the ignition-element holder (32) after the explosive (42) has been forced out of the explosives container (36; 92).

9. Blasting device according to claim 6, characterised in that the explosives container (36; 92) is an elongated cylinder body (40) and the forcing out device is a plunger (64) which can be moved in a longitudinal direction in the cylinder body (40).

10. Blasting device according to claim 9, characterised in that the explosives container (36) has a pressure-hose connection (68) through which pressure can be applied to the rear side (72) of the plunger that is remote from the explosive (42).

11. Blasting device according to claim 6, characterised in that the ignition-element holder (32) has a protective pocket (54), which surrounds the ignition element (34), for the purpose of accommodating the explosive (42) which has been forced out.

12. Blasting device according to claim 6, characterised in that the plunger (64) forms the pushing off device, with the plunger (64) and the explosives container (36; 92) being designed in such a way that at the end of its forcing out travel the plunger pushes the ignition-element holder (32) off from the explosives container (36; 92).

13. Blasting device according to claim 6, characterised in that the pushing off device is formed by a fluid channel (86) on the explosives container (36), in which case the fluid channel (86) ends at a stop face of the ignition-element holder (82) and pressure can be applied to it by way of the pressure-hose connection (68) for the purposes of pushing off.

14. Blasting device according to claim 6, characterised in that the ignition-element holder (32) is designed as a permeable holding rame (52).

15. Blasting device according to claim 6, characterised in that the explosives container (36; 92) and the ignition-element holder (32) each have a coupling portion for detachably coupling together the explosives container (36; 92) and the ignition-element holder (32).

* * * * *